Patented May 21, 1940

2,201,816

UNITED STATES PATENT OFFICE 2,201,816

TRIMETHINE CYANINE DYES DERIVED FROM 4-METHYL-QUINOLINE DERIVATIVES

Edmund B. Middleton, New Brunswick, and George A. Dawson, North Brunswick Township, Middlesex County, N. J.

No Drawing. Application January 19, 1937, Serial No. 121,374

4 Claims. (Cl. 260—240)

This invention relates to new and useful dyes, more particularly dyes derived from 4-methyl-quinoline derivatives, and a method for the preparation thereof. It further relates to new and improved sensitized photographic emulsions, plates and films, and a method of preparing them.

It is an object of this invention to provide new and improved dyes which are especially useful in sensitizing photographic emulsions. A further object is to provide new and improved dyes derived from 4-methyl-quinoline derivatives. Another object is to produce dyes which sensitize photographic emulsions in the infra red with relatively low fog values. Other objects will appear hereinafter.

In accomplishing these objects, we prepare dyes containing a nucleus of the gamma-quinoline series having one or more substituent groups or atoms or a condensed ring attached to the carbocyclic portion thereof and connected through the carbon atom in the gamma or 4-position by a methenyl chain to one or more of the same or other heterocyclic nitrogen nuclei.

Our preferred dyes are those having the following general formula

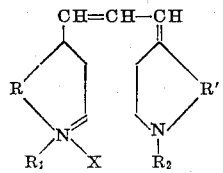

in which X represents the negative radical of an acid, e. g., iodide, chloride, bromide, para-toluene sulfonate, ethyl sulfate, chlorate, etc.: $R_1$ and $R_2$ represent aliphatic hydrocarbon radicals, e. g., methyl, ethyl, propyl, allyl, and higher homologues; R and R' represent condensed ring aromatic radicals, (e. g., of the naphthalene series, which may be substituted or unsubstituted) or substituted benzene radicals, for example, radicals of the benzene series containing substituents selected from the group consisting of alkyl (methyl, ethyl, and higher homologues), alkoxy (methoxy, ethoxy, and higher homologues), halogen (—Cl, —Br, —I, —F), substituted amino (dimethylamino, diethylamino, etc.), aryl (e. g. phenyl, tolyl) and other radicals capable of varying the sensitivity range of the dye in a gelatino silver halide photographic emulsion.

In preparing our new dyes, we employ as starting materials compounds having the following general formula (2) 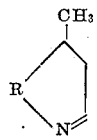

in which R represents a condensed ring aromatic radical which may or may not contain monovalent substituents in place of hydrogen, or a radical of the benzene series containing monovalent substituents. The monovalent substituents in the aromatic ring may be, for example, alkyl (e. g., methyl, ethyl, propyl, etc.), alkoxy (e. g., methoxy, ethoxy, etc.), halogen (—Cl, —Br, —I, —F), substituted amino (dimethylamino, diethylamino, etc.), aryl (e. g., phenyl) and other monovalent substituents capable of varying the sensitivity range of the resultant dye.

These compounds (Formula 2) may be prepared by condensing one mole of methyl vinyl ketone with one mole of a primary aromatic amine having a free ortho position, and containing in one or more of the other positions a monovalent substituent or a condensed ring which may or may not be substituted. The conditions of condensation are such as to eliminate both hydrogen and water and may be similar to the conditions used in the Skraup synthesis. The preferred conditions involve the reaction of one mole of primary aromatic amine with one mole of methyl vinyl ketone in the presence of concentrated aqueous hydrochloric acid, ferrous chloride, and a substance such as nitrobenzene, under the influence of heat.

Thus, one mole of methyl vinyl ketone may be reacted under the conditions described with one mole of any of the follow-primary aromatic amines: o, m and p toluidines, o, m, and p anisidines, o, m and p phenetidines, xylidines having a position ortho to the amino group free, o, m, and p chloroanilines, amino diphenyl, benzidine, p-phenylene diamine, alpha- and beta-naphthyl-amines, 2-methyl-5-amino benzothiazole, 2-ethyl-5-amino benzothiazole, and the corresponding oxazoles and selenazoles.

One mole of the compound of Formula 2 is then heated with one mole of an aliphatic ester in a well known manner to produce the quaternary salt having the formula (3) 

in which R is the same as in Formula 2, X represents the negative radical of an acid, e. g., iodide, chloride, bromide, paratoluene sulfonate, ethyl sulfate, perchlorate, etc.; and $R_i$ represents an aliphatic hydrocarbon radical, e. g., methyl, ethyl, propyl, allyl, and higher homologues.

The quaternary salts of Formula 3 are then converted to dyes according to known general methods. By heating the quaternary base (e. g., 2 to 3 moles) with ethyl orthoformate (e. g., 1 to 4 moles) in the presence of a base, e. g., pyridine, piperidine, tri-n-propyl amine, triethanolamine, or another acid binding agent or solvent, the carbocyanine and neocyanines are formed. With the quaternary iodide bases, apparently the normal carbocyanine is the principal dye formed.

The invention will be further illustrated but is not limited by the following examples in which the quantities are stated in parts by weight, unless otherwise indicated:

*Example I*

One mole of para-toluidine, 1 mole of aqueous hydrochloric acid (178 parts of 31% solution) and about 3 to 4 parts of ferrous chloride were mixed together and heated to a temperature within the range of about 90° to 95° C. One mole of methyl vinyl ketone mixed with about 25 to 30 parts of nitrobenzene was added with stirring, and heating was continued for about 2½ hours. Thereafter, the mixture was cooled, made alkaline with a solution of about 83 parts sodium hydroxide in 320 parts water and extracted with ether. The reaction product was distilled to obtain 4,6-dimethyl quinoline, boiling at about 274° to 276° C.

The 4,6-dimethyl quinoline thus obtained was heated with ethyl iodide under a reflux condenser, using slightly more than the theoretical proportions of ethyl iodide (1 mole+25%). The 4,6-dimethyl quinoline ethiodide was recrystallized from alcohol and dried.

Two parts of the thiodide of 4,6-dimethyl quinoline and 1 part of ethyl orthoformate in about 30 parts of dry pyridine were boiled under a reflux condenser for one hour. A grass green color developed. On cooling and adding water, greenish gold crystals separated. The first crystals to appear on recrystallization were kept separate as the presence of a neo derivative was suspected. The remaining crystals were tested in gelatino silver halide emulsions and found to be a better sensitizer than kryptocyanine. This dye also gave much lower fog values than kryptocyanine.

The first crystals separated gave substantially the same sensitivity. The peak in each case was at 760 mu. mu.

The dye apparently has the formula

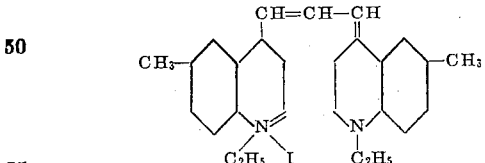

This dye may be called 6,6'-dimethyl kryptocyanine. Alternatively, this dye may be called 1,1'-diethyl - 6,6' - dimethyl - 4,4' - carbocyanine iodide.

*Example II*

One mole of alpha naphthylamine and about 5.5 parts of ferrous chloride (FeCl₂2H₂O) were mixed with about 400 parts of 31% aqueous hydrochloric acid and the mixture heated to a temperature of about 90° to 95° C. To this mixture was added 1 mole (70 parts) of methyl vinyl ketone in about 25 parts of nitrobenzene. After the methyl vinyl ketone had been added, heating was conntinued for approximately 2 hours and 15 minutes at 90° to 100° C. The mixture was then cooled and made alkaline with 190 parts of sodium hydroxide in 800 parts of water and extracted with ether. The reaction mixture was distilled twice and a 4-methyl naphtho quinoline containing the fused-on benzene ring in the 7÷8 positions crystallized on standing. Recrystallization from ethyl alcohol yielded crystals which melted at about 75° C.

The etho-p-toluene sulfonate quaternary salt was made by heating equimolecular proportions of the 4-methyl naphtho quinoline, produced as above described, and etho-p-toluene sulfonate, for 3 hours at 140° to 150° C.

Approximately 6.4 parts of the 4-methyl naphtho quinoline etho-p-toluene sulfonte, formed as described above, 30 parts of pyridine and 5.4 parts of ethyl orthoformate were then heated under a reflux condenser for an hour. A bluish green color developed. An excess of potassium iodide over that required to form the carbocyanine was added. They were dissolved in alcohol and separated from a small amount of brown insoluble material, which appeared to be neocyanine. Greenish gold crystals separated on cooling from the alcohol solution. They sensitized a silver bromide photographic emulsion in the range from 680 mu. mu. to 780 mu. mu. with a peak of 755 mu. mu.

The fog values were much lower than with kryptocyanine. This dye has the following formula

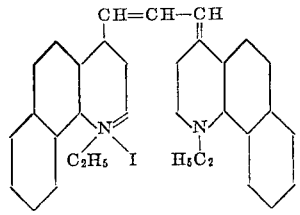

This dye may be called 7,8,7',8'-dibenzo kryptocyanine or alpha naphtho kryptocyanine. Alternatively this dye may be called 1,1'-diethyl-7,8,7',8'-di-Bz-4,4'-carbocyanine iodide.

*Example III* p-Phenetidine was substituted for the p-toluidine in Example I, the reaction otherwise being carried out as therein described, to obtain 4-methyl-6-ethoxy-quinoline, which upon recrystallization melted at about 78° C. This was then converted to 4-methyl-6-ethoxy-quinoline ethiodide by heating 1 mole of the base with 1.25 moles of ethyl iodide under a reflux condenser. The quaternary salt was recrystallized from ethyl alcohol and dried. One part of the 4-methyl-6-ethoxy quinoline ethiodide was then reheated for 15 minutes under a reflux condenser with about 5.5 parts of acetic anhydride and 2.7 parts of ethyl orthoformate. Greenish gold crystals formed together with a small amount of a more insoluble compound which appeared to be a neo cyanine. The greenish gold compound was a dye having the following formula

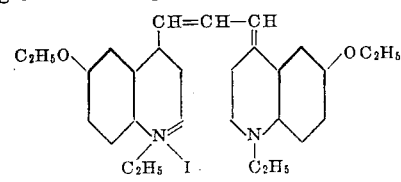

This dye may be called 6,6'-diethoxy kryptocyanine. Alternatively, this dye may be called 1,1'- diethyl - 6,6' - diethoxy - 4,4' - carbocyanine iodide.

Our new dyes are also useful for dyeing fibrous materials. In connection with photography and particularly for sensitizing photographic emulsions, they are especially useful. They may be used, for example, in all the known types of photographic emulsions, for instance, the gelatino silver chloride and the gelatino silver bromide emulsions. Certain of the dyes are especially valuable for infra red sensitizing. Thus, the dyes of Examples I and II are better sensitizers than kryptocyanine and have much lower fog values. Kryptocyanine is a very difficult sensitizer to use since it can only be employed in very small concentrations because it produces high fog values when the concentration exceeds a certain low amount.

The method of preparing the gelatino silver halide emulsions is well known in the art. Usually a stock solution of the dye is first prepared by dissolving it in an alcohol, for example, methyl alcohol or ethyl alcohol. Ten to fifteen milligrams of the dye may be dissolved in about 40 parts of alcohol and this may be added to one liter of gelatino silver halide emulsion. The sensitized emulsion may then be coated on plates or films. It will be understood that these proportions are illustrative, not limitative, and that other methods may be used for incorporating the dye in the photographic film, plate or emulsion.

The terms "auxochrome" and "auxochromic substituent" are used herein in the generic sense to cover any group or atom which intensifies the color of a chromophore or develops a color from a chromogen (Hackh, Chemical Dictionary, 1929.)

As many apparently widely different embodiments of this invention may be made without departing from the spirit and scope thereof, it is to be understood that we do not limit ourselves to the specific embodiments thereof except as described in the following claims.

We claim:
1. A 1,1'-dialkyl-7,8,7',8'-di-Bz-4,4'-carbocyanine salt.
2. A 1,1'-diethyl-7,8,7'8'-di-Bz-4,4'-carbocyanine salt.
3. A 1,1'-dialkyl-7,8,7',8'-di-Bz-4,4'-carbocyanine iodide.
4. The compound 1,1'-diethyl-7,8,7',8'-di-Bz-4,4'-carbocyanine iodide.

EDMUND B. MIDDLETON.
GEORGE A. DAWSON.